US010787912B2

(12) United States Patent
Anderson et al.

(10) Patent No.: US 10,787,912 B2
(45) Date of Patent: Sep. 29, 2020

(54) SPIRAL CAVITIES FOR GAS TURBINE ENGINE COMPONENTS

(71) Applicant: United Technologies Corporation, Farmington, CT (US)

(72) Inventors: Corey D. Anderson, East Hartford, CT (US); Brandon W. Spangler, Vernon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 154 days.

(21) Appl. No.: 15/962,074

(22) Filed: Apr. 25, 2018

(65) Prior Publication Data
US 2019/0330987 A1    Oct. 31, 2019

(51) Int. Cl.
*F01D 5/18*    (2006.01)
*F01D 25/12*   (2006.01)
*F02C 7/18*    (2006.01)
*F01D 9/06*    (2006.01)

(52) U.S. Cl.
CPC .............. *F01D 5/188* (2013.01); *F01D 5/187* (2013.01); *F01D 9/065* (2013.01); *F01D 25/12* (2013.01); *F02C 7/18* (2013.01); *F05D 2240/126* (2013.01); *F05D 2240/81* (2013.01); *F05D 2250/15* (2013.01); *F05D 2250/24* (2013.01); *F05D 2250/25* (2013.01); *F05D 2260/201* (2013.01)

(58) Field of Classification Search
None
See application file for complete search history.

(56) References Cited

U.S. PATENT DOCUMENTS 3,540,810 A    11/1970  Kercher
3,628,880 A *  12/1971  Smuland ................ F01D 5/189
                                              415/175

(Continued)

FOREIGN PATENT DOCUMENTS

DE    2628807 A1    1/1977
EP    3141699 A1    3/2017

(Continued)

OTHER PUBLICATIONS

Partial European Search Report for European Application No. 19159193.2, International Filing Date Feb. 25, 2019, dated Jul. 10, 2019, 13 pages.

(Continued)

Primary Examiner — Woody A Lee, Jr.
Assistant Examiner — Jason G Davis
(74) Attorney, Agent, or Firm — Cantor Colburn LLP

(57) ABSTRACT

Baffles and airfoils for installation within gas turbine engines are provided. The baffles include a baffle side wall extending between a first end and a second end and a baffle divider within the baffle side wall, wherein the baffle divider and the baffle side wall define a first cavity and a second cavity. The first cavity is located at a first side at the first end and the second cavity is located at a second side at the first end and the baffle divider includes a spiral portion such that the first cavity is transitioned toward the second side and the second cavity is transitioned toward the first side.

19 Claims, 8 Drawing Sheets

(56) References Cited

U.S. PATENT DOCUMENTS

| | | | |
|---|---|---|---|
| 5,002,460 A * | 3/1991 | Lee | F01D 5/188 |
| | | | 415/115 |
| 5,207,556 A | 5/1993 | Frederick et al. | |
| 5,634,766 A | 6/1997 | Cunha et al. | |
| 5,704,763 A | 1/1998 | Lee | |
| 5,993,156 A * | 11/1999 | Bailly | F01D 5/187 |
| | | | 415/115 |
| 6,142,730 A * | 11/2000 | Tomita | F01D 5/187 |
| | | | 415/114 |
| 6,837,683 B2 | 1/2005 | Dailey | |
| 7,008,185 B2 | 3/2006 | Peterman et al. | |
| 8,043,057 B1 | 10/2011 | Liang | |
| 8,393,867 B2 | 3/2013 | Chon et al. | |
| 10,012,093 B2 * | 7/2018 | Mugglestone | F01D 5/188 |
| 2015/0159494 A1 | 6/2015 | Carrier et al. | |
| 2017/0198602 A1 | 7/2017 | Hernandez et al. | |
| 2017/0211416 A1 | 7/2017 | Weaver et al. | |
| 2019/0292918 A1 * | 9/2019 | Botrel | F01D 5/187 |

FOREIGN PATENT DOCUMENTS

| | | | | |
|---|---|---|---|---|
| WO | 2015094531 A1 | 6/2015 | | |
| WO | 2015160404 A2 | 10/2015 | | |
| WO | 2017207924 A1 | 12/2017 | | |
| WO | WO-2017207924 A1 * | 12/2017 | | F01D 5/30 |

OTHER PUBLICATIONS

European Search Report for European Application No. 19159193.2, International Filing Date Feb. 25, 2019, dated Oct. 23, 2019, 12 pages.

* cited by examiner

SPIRAL CAVITIES FOR GAS TURBINE ENGINE COMPONENTS

STATEMENT REGARDING FEDERALLY SPONSORED RESEARCH OR DEVELOPMENT

This invention was made with government support under Contract No. W58RGZ-16-C-0046 awarded by the U.S. Army. The government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Cooling air, depending on the airfoil configuration (e.g., blade, vane, etc.) may be supplied from an inner diameter and/or an outer diameter thereof. For example, typically blades are fed cooling air through a platform at an inner diameter thereof. Vanes, however, may be fed cooling air from one or both of the inner and outer diameters. In some arrangements, the platforms of the airfoils may be configured with platform cover plates with impingement holes. The cover plates may be arranged to direct cooling air onto the non-gaspath surfaces of the platform itself, to thus cool the platform.

The cool air may pass through the cover plate, impinge upon the platform, and then flow into one or more cooling cavities of the airfoil. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, baffles for installation within gas turbine engines are provided. The baffles include a baffle side wall extending between a first end and a second end and a baffle divider within the baffle side wall, wherein the baffle divider and the baffle side wall define a first cavity and a second cavity. The first cavity is located at a first side at the first end and the second cavity is located at a second side at the first end and the baffle divider includes a spiral portion such that the first cavity is transitioned toward the second side and the second cavity is transitioned toward the first side.

In addition to one or more of the features described above, or as an alternative, further embodiments of the baffles may include that the first side includes one or more impingement holes.

In addition to one or more of the features described above, or as an alternative, further embodiments of the baffles may include an end cap located at the second end and sealing an end of the second cavity.

According to some embodiments, components for gas turbine engines are provided. The components include a platform, an airfoil extending from the platform, wherein the airfoil comprises a first cavity inlet at a first side and a second cavity inlet at a second side and the airfoil has a first cavity and a second cavity separated by a divider, the divider having a spiral portion and the first cavity inlet is fluidly connected to the first cavity and the second cavity inlet is fluidly connected to the second cavity, a cover plate attached to the platform on a side opposite the airfoil, wherein a platform cavity is defined between the cover plate and the platform, and a cavity separating rail dividing the platform cavity into a first platform cavity and a second platform cavity, wherein the first platform cavity is fluidly connected to the first cavity through the first cavity inlet and the second platform cavity is fluidly connected to the second cavity through the second cavity inlet. A flow of air from the first platform cavity enters the airfoil at the first inlet and flows through the first cavity along the first side and is transitioned toward the second side by the spiral portion of the divider and a flow of air from the second platform cavity enters the airfoil at the second inlet and flows through the second cavity along the second side and is transitioned toward the first side by the spiral portion of the divider.

In addition to one or more of the features described above, or as an alternative, further embodiments of the components may include that the cover plate includes a first sub-plate and a second sub-plate, wherein the first sub-plate covers the first platform cavity and the second sub-plate covers the second platform cavity.

In addition to one or more of the features described above, or as an alternative, further embodiments of the components may include that the first sub-plate includes a first cavity impingement cooling aperture array and the second sub-plate includes a second cavity impingement cooling aperture array.

In addition to one or more of the features described above, or as an alternative, further embodiments of the components may include that the first cavity impingement cooling aperture array comprises a plurality of holes having a first flow area and the second cavity impingement cooling aperture array comprises a plurality of holes having a second flow area.

In addition to one or more of the features described above, or as an alternative, further embodiments of the components may include that the first flow area is less than the second flow area.

In addition to one or more of the features described above, or as an alternative, further embodiments of the components may include that the airfoil comprises a baffle installed therein, wherein the divider is part of the baffle.

In addition to one or more of the features described above, or as an alternative, further embodiments of the components may include a second airfoil extending from the platform, wherein the second airfoil comprises a respective first cavity inlet at a first side and a respective second cavity inlet at a second side and the second airfoil has a first cavity and a second cavity separated by a divider, the divider having a spiral portion and the first cavity inlet is fluidly connected to the first cavity and the second cavity inlet is fluidly connected to the second cavity, wherein the cover plate covers the first and second cavity inlets of the second airfoil.

In addition to one or more of the features described above, or as an alternative, further embodiments of the components may include that the cover plate includes a first sub-plate and a second sub-plate formed as a unitary body.

In addition to one or more of the features described above, or as an alternative, further embodiments of the components may include that the cover plate includes a first sub-plate and a second sub-plate formed as separate sheets of material that are welded to the platform.

In addition to one or more of the features described above, or as an alternative, further embodiments of the components may include that the first side includes one or more impingement holes.

In addition to one or more of the features described above, or as an alternative, further embodiments of the components may include an end cap located to seal an end of the second cavity.

According to some embodiments, gas turbine engines are provided. The gas turbine engines include a combustor section and a turbine section downstream from the combustor section. The turbine section comprising at least one component that includes a platform, an airfoil extending from the platform, wherein the airfoil comprises a first cavity inlet at a first side and a second cavity inlet at a second side and the airfoil has a first cavity and a second cavity separated by a divider, the divider having a spiral portion and the first cavity inlet is fluidly connected to the first cavity and the second cavity inlet is fluidly connected to the second cavity, a cover plate attached to the platform on a side opposite the airfoil, wherein a platform cavity is defined between the cover plate and the platform, and a cavity separating rail dividing the platform cavity into a first platform cavity and a second platform cavity, wherein the first platform cavity is fluidly connected to the first cavity through the first cavity inlet and the second platform cavity is fluidly connected to the second cavity through the second cavity inlet. A flow of air from the first platform cavity enters the airfoil at the first inlet and flows through the first cavity along the first side and is transitioned toward the second side by the spiral portion of the divider and wherein a flow of air from the second platform cavity enters the airfoil at the second inlet and flows through the second cavity along the second side and is transitioned to the first side by the spiral portion of the divider.

In addition to one or more of the features described above, or as an alternative, further embodiments of the gas turbine engines may include that the cover plate includes a first sub-plate and a second sub-plate, wherein the first sub-plate covers the first platform cavity and the second sub-plate covers the second platform cavity.

In addition to one or more of the features described above, or as an alternative, further embodiments of the gas turbine engines may include that the first sub-plate includes a first cavity impingement cooling aperture array and the second sub-plate includes a second cavity impingement cooling aperture array.

In addition to one or more of the features described above, or as an alternative, further embodiments of the gas turbine engines may include that the airfoil comprises a baffle installed therein, wherein the divider is part of the baffle.

In addition to one or more of the features described above, or as an alternative, further embodiments of the gas turbine engines may include a second airfoil extending from the platform, wherein the second airfoil comprises a respective first cavity inlet at a first side and a respective second cavity inlet at a second side and the second airfoil has a first cavity and a second cavity separated by a divider, the divider having a spiral portion and the first cavity inlet is fluidly connected to the first cavity and the second cavity inlet is fluidly connected to the second cavity, wherein the cover plate covers the first and second cavity inlets of the second airfoil.

In addition to one or more of the features described above, or as an alternative, further embodiments of the gas turbine engines may include that the airfoil comprises a baffle installed therein, wherein the divider is part of the baffle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
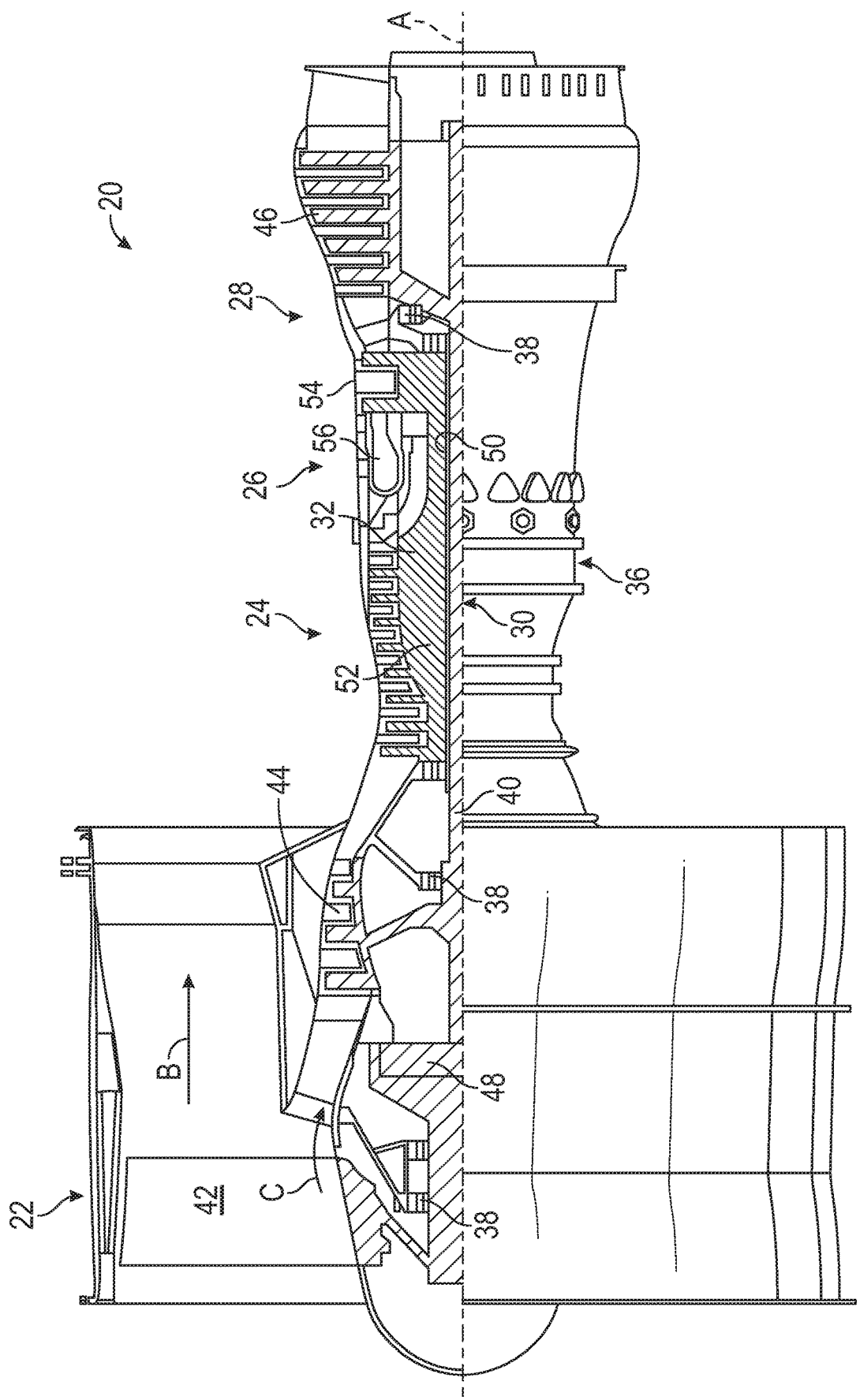
FIG. 1 is a schematic cross-sectional illustration of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the gear system is an epicyclic gear train, such as a planetary gear system or other gear system 48, with a gear reduction ratio of greater than about 2.3 and the low pressure turbine 46 has a pressure ratio that is greater than about five.

In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
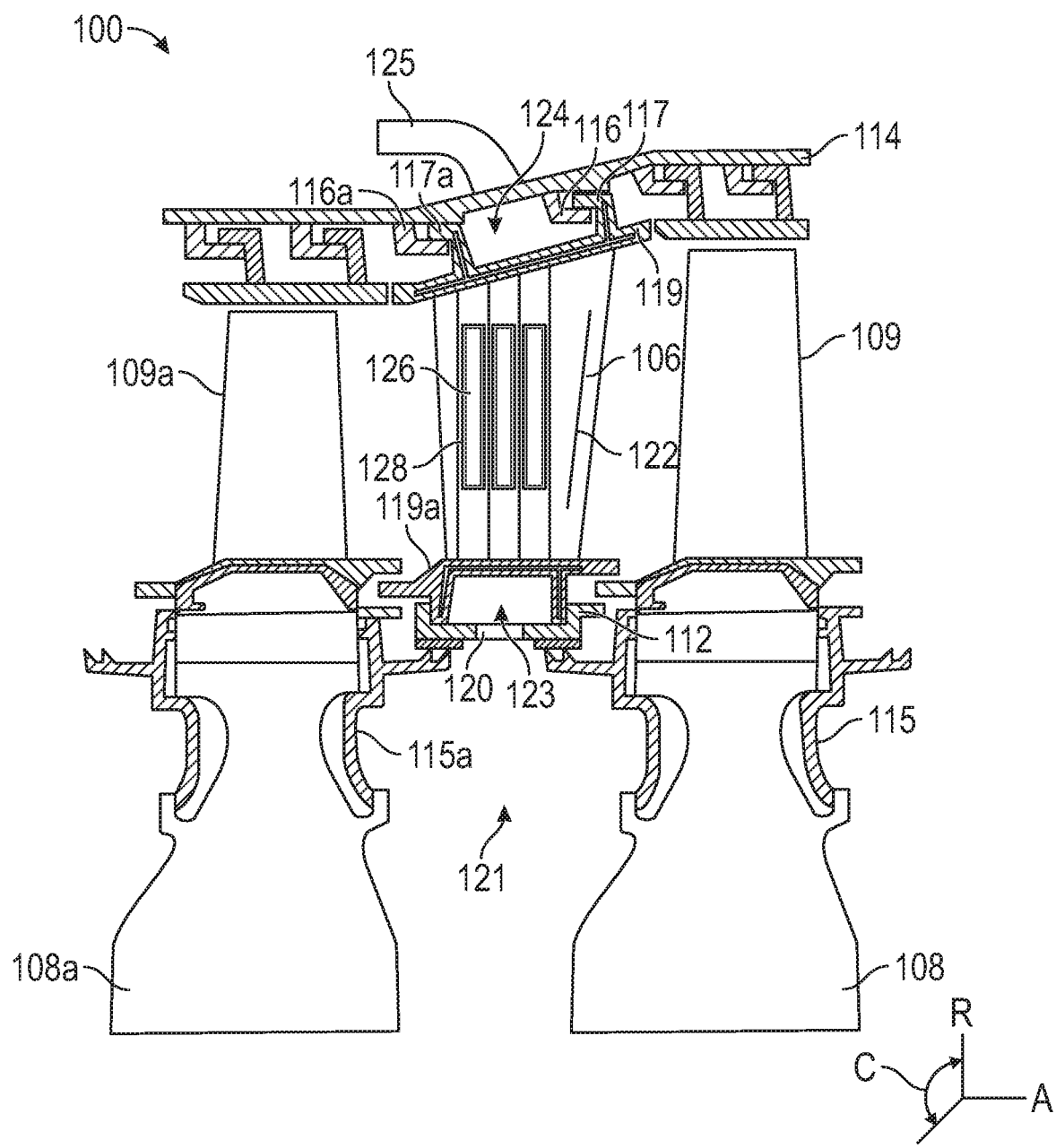
FIG. 2 is a schematic illustration of a portion of a turbine section of a gas turbine engine that may incorporate embodiments of the present disclosure.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

A turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119a can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

In a conventional vane design, often the cooling air to be utilized on a platform is ejected into the main gas path through film cooling holes directly on the exterior gaspath surface of the inner diameter and/or outer diameter vane platform(s). However, embodiments provided herein are directed to utilizing cooling air at or from the platform for cooling both the platform and the main body of the airfoil. Such cooling air will flow from the platform area/cavity into a radially extending airfoil cavity. In cooling design configurations where the same coolant flow is utilized to cool the inner diameter and/or the outer diameter platforms and the airfoil exterior hot walls, it may be necessary to provide convective cooling along platform surfaces that are immediately adjacent to both the airfoil pressure and suction side surfaces. In this scenario, platform cooling air flow may be "drawn" from various opposing and non-opposing directions in order to provide the necessary cooling airflow required to adequately cool the vane airfoil pressure side and suction side surfaces, as well as, the vane airfoil leading and trailing edge surfaces.

Figure 3A:
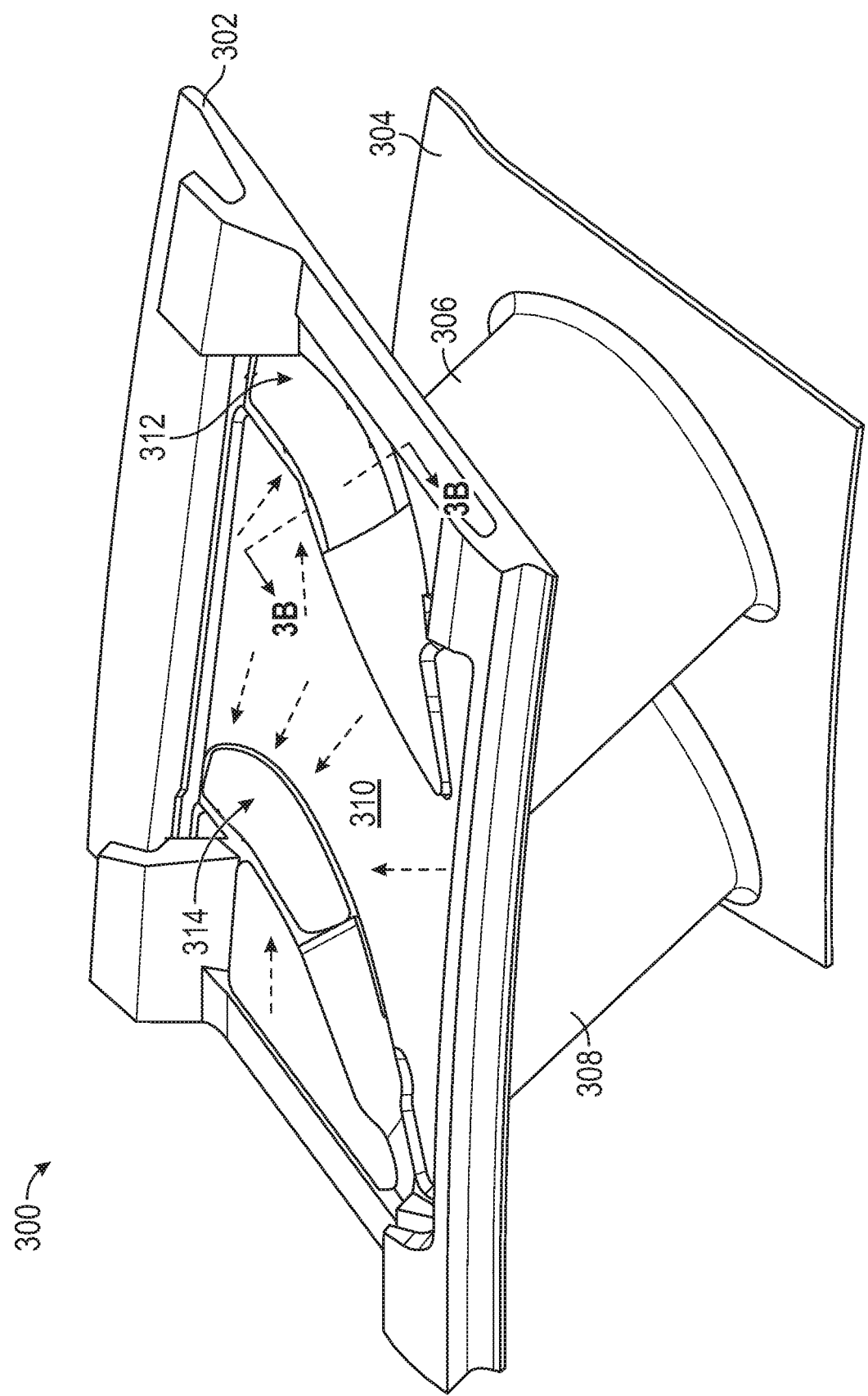
FIG. 3A is a schematic illustration of a component of a gas turbine engine that may incorporate embodiments of the present disclosure.
Figure 3B:
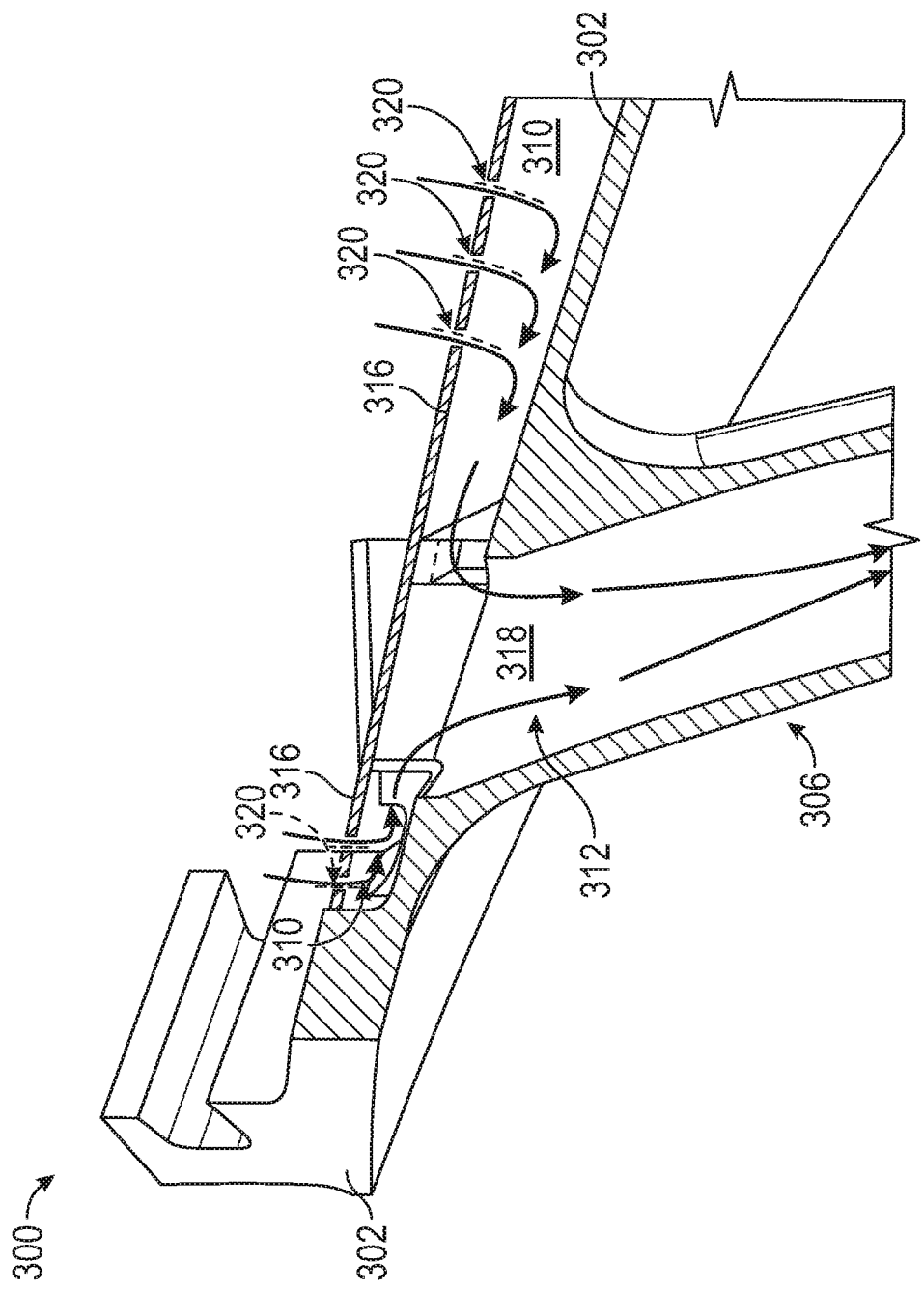
FIG. 3B is a side view of an airfoil and platform of the component of FIG. 3A having a cover plate installed to the platform, as viewed along the line 3B-3B.

Turning to FIGS. 3A-3B, a gas turbine engine component 300 is schematically shown, with FIG. 3A being an isometric view thereof and FIG. 3B being a side, cross-sectional view of the component 300 with a cover plate installed as viewed along the line 3B-3B. The gas turbine engine component 300 includes a first platform 302 and a second platform 304. Extending between the first and second platforms 302, 304 are a first airfoil 306 and a second airfoil 308. The gas turbine engine component 300, as shown, forms a portion of a vane section that can be installed in a turbine section of a gas turbine engine (e.g., as shown and describe above).

As shown in FIG. 3A, the airfoils 306, 308 include a plurality of airfoil cavities, which are open to and in fluid communication with a platform space or platform cavity 310. In FIG. 3A, the platform cavity 310 is formed between the illustrated surface of the first platform 302 and a cover plate (as shown in FIG. 3B). Those of skill in the art will appreciate that use of cover plates on platforms to form the platform cavities, and the cover plate is not shown for clarity and simplicity of illustration. Accordingly, as will be appreciated by those of skill in the art, a platform cavity is a cavity or volume that is formed between a surface of a platform on a side opposite a main, hot gaspath of the platform (i.e., a backside surface of the platform) and a cover plate that is installed to the platform. The platform cavity in operation will act as a cooling air channel that is formed between the cover plate and the backside of the platform surface which creates a conduit for cooling air to be transferred across the cold side of platform surfaces to provide convective cooling. The cover plate may include one or more inlet apertures, such as impingement holes, that are arranged to provide impingement cooling to the cold side surface of the platform and flow through the platform cavity.

The cooling air within the platform cavity is fed into inlets of a vane airfoil to provide cooling within the vanes, as appreciated by those of skill in the art. Such inlets can be provided at both inner and outer diameter platforms of the airfoil (e.g., first and second platforms 302, 304) and thus cooling air can be provided from one or more opposing platform cavities. Those of skill in the art will appreciate that the cover plates can include a single inlet feed for cooling air or may include multiple impingement holes (e.g., an array).

As shown in FIG. 3A, the first airfoil 306 includes respective airfoil cavity inlet 312 and the second airfoil 308 includes respective airfoil cavity inlet 314. The airfoil cavity inlets 312, 314 are inlets to internal airfoil cavities that, in some arrangements, extend from the first platform 302, through the respective airfoil 306, 308, and to the second platform 304, thus providing a cooling flow path through the respective airfoil 306, 308. In some arrangements, the airfoils 306, 308 are integrally formed with the platforms 302, 304 and in other arrangements, the airfoils 306, 308 can be separately formed and subsequently attached to the platforms 302, 304. Air within the platform cavity 310 (between the first platform 302 and a cover plate) can be fed into the airfoil cavity inlets 312, 314. In typical airfoil/platform arrangements, the cooling air within the platform cavity 310 will enter the airfoil cavity inlets 312, 314 from any/all directions, thus causing cooling flow efficiency issues (e.g., due to turbulent interactions). In some airfoil/platform arrangements, multiple platform sub-cavities can be formed between adjacent airfoils (e.g., between first and second airfoil 306, 308) along the backside of the first platform 302. In some such arrangements, the cooling air from two platform sub-cavities will flow toward each other at the airfoil cavity inlets 312, 314. A schematic illustration of airflow from the platform cavity 310 flowing toward the airfoil cavity inlets 312, 314 in opposing directions is shown by the dashed arrows of FIG. 3A.

Turning now to FIG. 3B, a side view illustration of the gas turbine engine component 300 having a cover plate 316 installed to the first platform 302 is shown. The cover plate 316, when installed to the first platform 302, defines the platform cavity 310 between the structure of the first platform 302 and the cover plate 316, as shown. FIG. 3B also illustrates the flow direction of cooling air flowing through the cover plate 316 and into an airfoil cavity 318 of the first airfoil 306. As shown, the first airfoil 306 is integrally formed with the platform 302. The airfoil cavity 318 is fluidly connected to the platform cavity 310 through the airfoil cavity inlet 312 of the first airfoil 306.

The cover plate 316, as shown, includes a plurality of cooling holes 320 (e.g., holes, apertures, slots, impingement holes, etc.) that enable a cooling flow to enter the platform cavity 310. A cooling flow enters the platform cavity 310 through the cooling holes 320 and travels along a surface of the platform 302 and into the airfoil cavity 318. Although shown in FIG. 3B with the use of an arrangement of multiple cooling holes 320 formed in the cover plate 316, those of skill in the art will appreciate that other arrangements (e.g., single feed port) can be used without departing from the scope of the present disclosure.

As shown in FIG. 3B, airflow into the airfoil cavity 318 is sourced from two opposing sides at the airfoil cavity inlet 312. As will be appreciated when viewing FIG. 3A, such cooling air may be sourced from any direction, mix, and enter the respective airfoil cavity inlets 312, 314. In some embodiments, the use of baffles may provide for improved or optimized cooling schemes (e.g., as shown in FIG. 2). However, in some embodiments a single baffle may be employed for an entire span of an airfoil (or span a large section of the airfoil), such as from leading edge to trailing edge. However, such baffles typically cannot be optimized for the different cooling requirements of the airfoil, such as at the outer diameter, along the pressure and suction sides, and/or at the leading edge. Certain portions of the airfoil may require increased cooling due to higher heat loads applied thereto (e.g., at the leading edge, outer diameter portion). To account for this, divided baffles may be employed, wherein the baffle defines multiple internal cavities to direct some air to the leading edge and some air to aft portions of the airfoil. Although such arrangement may improve cooling, further improvements may be beneficial. In a divided baffle arrangement, a portion of the cooling flow may be directed to cooling the airfoil surfaces and another portion of the cooling flow may be directed as through flow that flows from one end (e.g., outer diameter) to the other end (e.g., the inner diameter) of the airfoil.

As noted, in traditional vane design, platform cooling can be provided by impingement cooling. In a baffled vane design, the cooling air is impinged on the platform and then moved into the baffle where it provides cooling air for the airfoil as well as a through flow. However, the specific demands of the through flow and a cooling flow (e.g., cooling flow used for specific parts of an airfoil, such as the leading edge) may be different. For example, because the through flow air is not used to cool the airfoil, it may have additional heatup margin in the platform, whereas the air used to cool the airfoil may have limited heatup capability in the platform. A traditional impingement design does not allow the two flow heatups to be optimized.

In traditional baffled airfoil designs, when an impingement plate is used to cool the platform, the impingement flow is used as both through flow and airfoil cooling flow. Because these flows are not drawn from separate sources, the cooling cannot be tailored individually and can result in under- or over-cooling depending on the circumstances. Accordingly, embodiments provided herein are directed to a dual-cavity baffle that segregates the flows and allows for optimization of the flows. For example, the forward-platform region tends to require more cooling than the aft-platform region. This results in a cooling flow entering the forward-cavity of the baffle to be relative warmer, due to the heat pickup at the forward-platform region. This may be detrimental for baffled airfoil designs that impinge cooling air out the baffle on the leading edge of the airfoil as this warmer air results in reduced airfoil cooling performance.

To enable customized and/or optimized cooling within the airfoil cavities, embodiments provided herein are directed to a modified baffle structure that switches the forward-aft orientation of specific flows as the flows move through the baffle. That is, in some embodiments, a spiraled baffle is provided to switch the position (e.g., forward versus aft) of the through flow and the airfoil cooling flow as the flows pass through the baffle and airfoil. Accordingly, in accordance with the present disclosure, in some embodiments, a through flow may enter the baffle (or airfoil) at the outer diameter in a baffle forward cavity, but as it travels radially inward, the baffle forward cavity spirals so that the cavity transitions into or toward a baffle aft cavity (i.e., transitions from the forward position toward the aft). The opposite is true for the airfoil cooling flow, which originates as a baffle aft cavity, and spirals or shifts to a baffle forward cavity.

Figure 4:
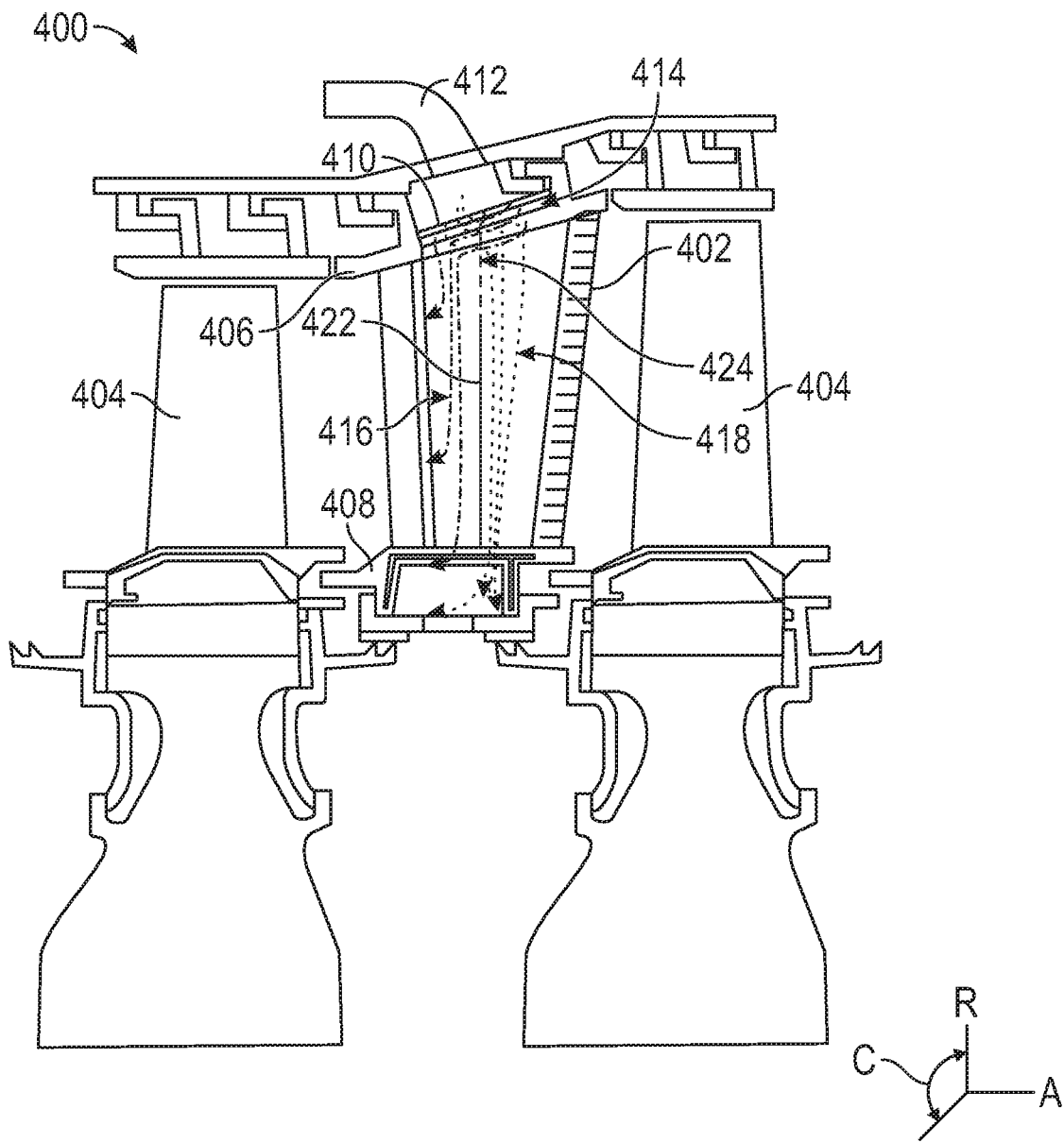
FIG. 4 is a schematic illustration of a portion of a turbine section of a gas turbine engine in accordance with an embodiment of the present disclosure.

Referring now to FIG. 4, a turbine section 400 having at least one vane 402 disposed between blades 404, in an axial direction A, is schematically shown. The turbine section 400 may be similar to that shown and described with respect to FIG. 2, and thus a detailed explanation will not be repeated. As shown, the vane 402 is disposed between a first platform 406 and a second platform 408, in a radial direction R. In this illustration the first platform 406 is an outer diameter platform and the second platform 408 is an inner diameter platform.

A platform cover plate 410 is installed on a cold side of the first platform 406. Although shown with a single vane 402, those of skill in the art will appreciate that a plurality of vanes may be provided, with adjacent vanes arranged in a circumferential direction C. A turbine cooling air (TCA) conduit 412 provides cooling air into an outer diameter supply cavity. The cooling air will flow through the platform cover plate 410 and enter a platform cavity 414 that is defined between the first platform 406 and the platform cover plate 410. The cover plate 410 may include one or more impingement holes to allow the flow of cooling air therethrough. The cooling air will then flow into one or more airfoil cavities. For example, as shown, a first airfoil cavity 416 is arranged along the leading edge of the vane 402 (e.g., a generally forward airfoil cavity) and a second airfoil cavity 418 is located aft of the first airfoil cavity 416 (e.g., a generally aft airfoil cavity).

In this embodiment, a spiraled divider 422 is contained within the vane 402 so that air can travel radially into and longitudinally downstream from the platform cavity 414 and into and through the first and second airfoil cavities 416, 418. The spiraled divider 422 separates the first and second airfoil cavities 416, 418. The first airfoil cavity 416 may be an airfoil body cooling cavity, wherein the cooling air therein is expelled through film cooling holes of the vane 402. Further, the second airfoil cavity 418 may be a through-flow cavity that directs cool air toward an inner radius of the turbine section 400.

The first platform 406 and the cover plate 410 are arranged to provide optimized cooling within the airfoil cavities 416, 418. To achieve the optimization of the cooling within the vane 402, a spiral portion 424 is included along the radial length of the spiraled divider 422 such that the forward-aft positions of the two airfoil cavities 416, 418 change relative position. Although shown as a forward-aft orientation, other arrangements are possible without departing from the scope of the present disclosure. For example, suction-pressure side, or skewed arrangements may be employed as desired to achieve a specific cooling scheme.

Figure 5:
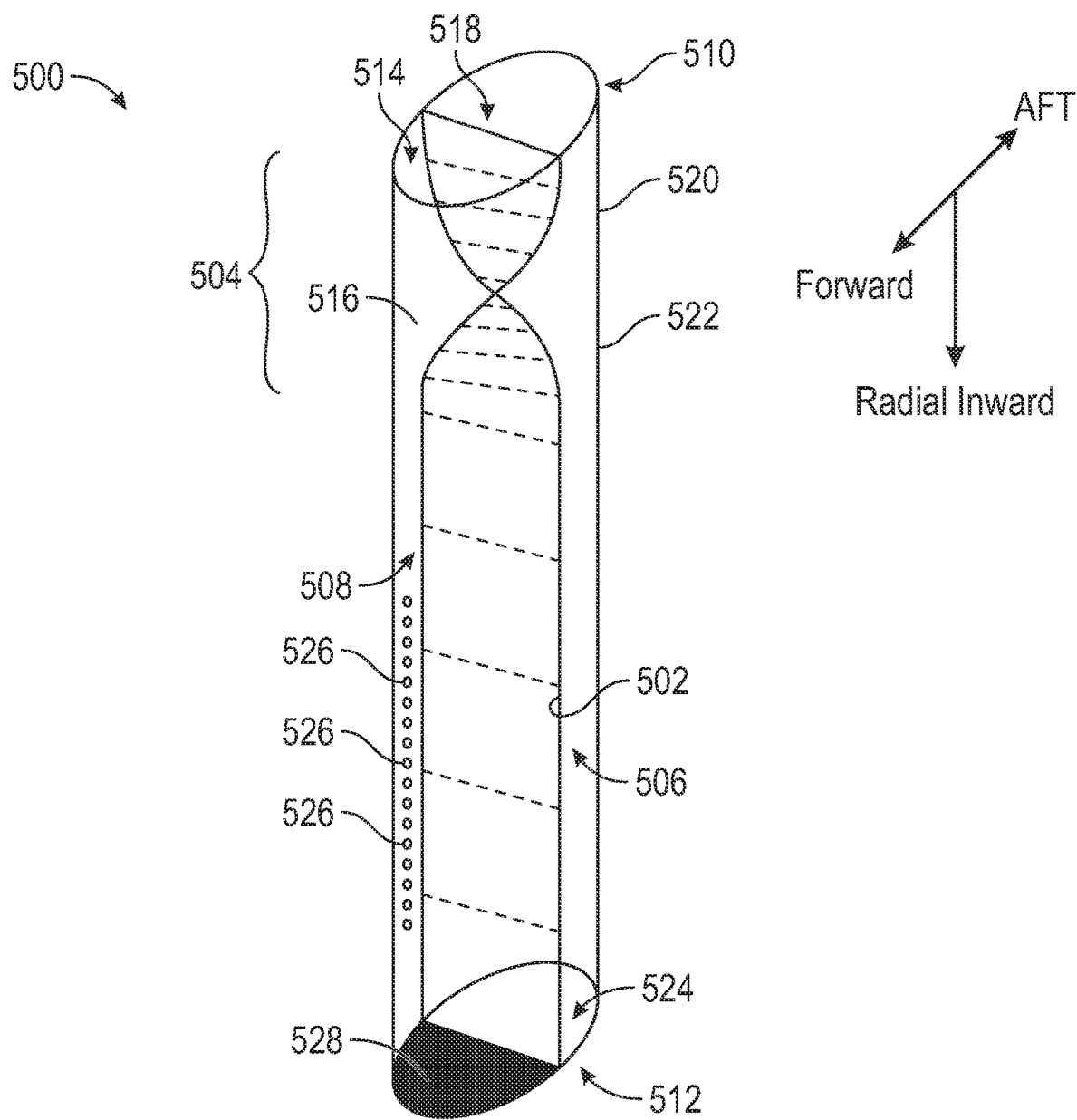
FIG. 5 is a schematic illustration of a spiral divided baffle in accordance with an embodiment of the present disclosure.

Turning now to FIG. 5, a schematic illustration of a spiral divided baffle 500 in accordance with an embodiment of the present disclosure is shown. The spiral divided baffle 500 is arranged to be inserted into an airfoil and provide cooling flow control as described herein. The spiral divided baffle 500 includes a baffle divider 502 there, with the baffle divider 502 having a spiral portion 504 that is arranged to shift an orientation of baffle cavities. For example, a first baffle cavity 506 and a second baffle cavity 508 are defined within the spiral divided baffle 500 and are fluidly separated by the baffle divider 502. The spiral divided baffle 500 extends between a first end 510 and a second end 512. In this illustrative embodiment, the first end 510 may be referred to as an inlet end and/or as a radially outward end, and the second end 512 may be referred to as an outlet end and/or as a radially inward end.

A first cavity inlet 514 is arranged at the first end 510 of the spiral divided baffle 500 and positioned at a first side 516 (e.g., as indicated "forward" side) and a second cavity inlet 518 is arranged at the first end 510 of the spiral divided baffle 500 and positioned at a second side 520 (e.g., as indicated "aft" side). The cavity inlets 514, 518 are arranged to receive cooling air from a platform cavity, when installed within an airfoil and assembled within a gas turbine engine. The air that enters the first cavity 506 through the first inlet 514 starts at the first side 516 at the first end 510 but is turned or transitioned toward the second side 520 after the spiral portion 504. Similarly, the air that enters the second cavity 508 through the second inlet 518 starts at the second side 520 at the first end 510 but is turned or transitioned toward the first side 516 after the spiral portion 504. In some embodiments, the transition may be a complete change from forward-to-aft and aft-to-forward. However, in some embodiments, the transitions may be partial transitions, for example, from forward-to-sidewall and aft-to-sidewall, or variations thereon. Thus, the present disclosure is not to be limited by the specific orientation and arrangement illustratively shown.

The spiral divided baffle 500 includes a baffle side wall 522. The baffle side wall 522 may be substantially cylindrical in shape and extend between the first end 510 and the second end 512. It will be appreciated that the baffle side wall 552 may mirror or otherwise conform or compliment a geometry of the airfoil into which it is installed, and thus cylindrical is not to be limiting, but rather is for example only. The first and second baffle cavities 506, 508 are defined between the baffle side wall 522 and the baffle divider 502. In some embodiments, various portions or regions of the baffle side wall 522 may be solid and in other portions or regions, the baffle side wall 522 may be arranged to allow airflow therethrough. For example, the first baffle cavity 506 may be defined by a substantially solid baffle side wall 522 wherein airfoil that enters the first baffle cavity 506 will flow radially inward through the spiral divided baffle 500 to an outlet 524 at the second end 512 of the spiral divided baffle 500. That is, the spiral divided baffle 500 may be open at the second end 512 of the first baffle cavity 506. Accordingly, the first baffle cavity 506 may be arranged as a through flow cavity, with airfoil able to pass from the first end 510 to the second end 512 of the spiral divided baffle 500.

However, the second baffle cavity 508 may be defined by the baffle side wall 522 having one or more impingement holes 526. For example, the portions of the baffle side wall 522 that define the second baffle cavity 508 may include the impingement holes 526 to enable impingement onto an interior surface of an airfoil. Accordingly, the second end 512 of the second baffle cavity 508 may be blocked or restricted with an end cap 528.

Figure 6A:
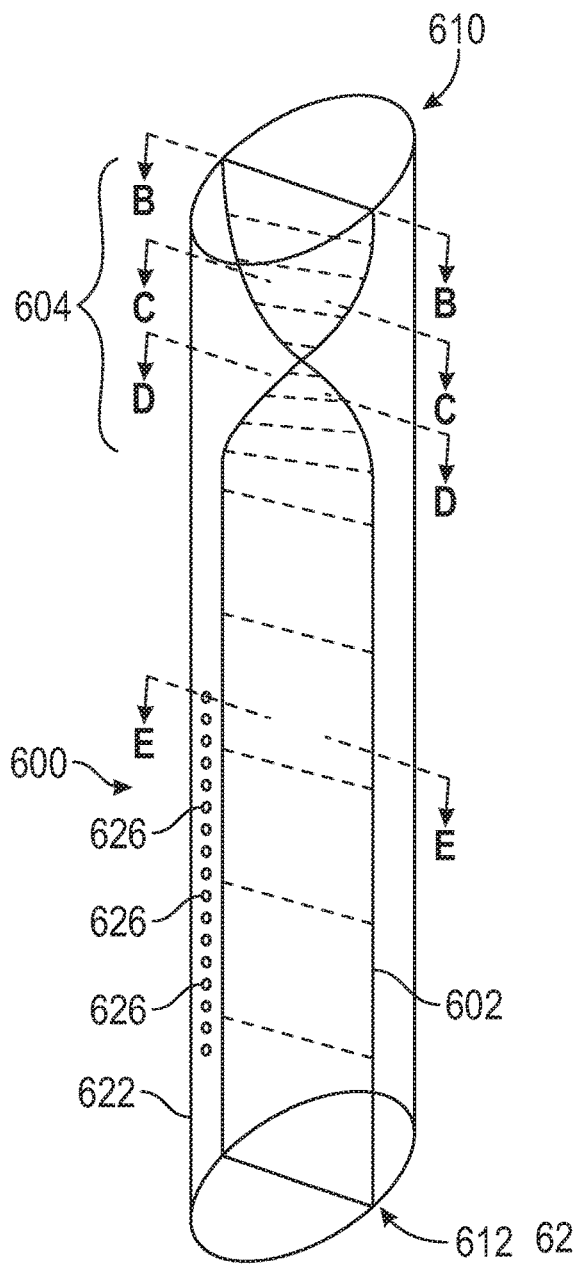
FIG. 6A is a schematic illustration of a spiral divided baffle in accordance with an embodiment of the present disclosure.
Figure 6B:
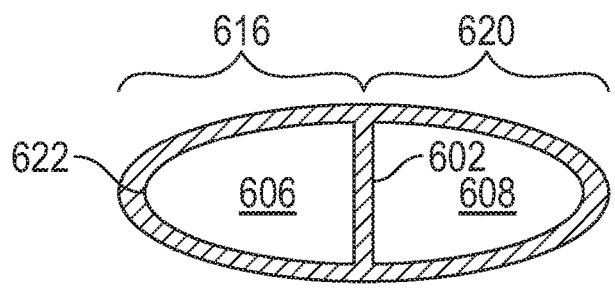
FIG. 6B is a cross-sectional illustration of the spiral divided baffle of FIG. 6A as viewed along the line B-B.

Turning now to FIGS. 6A-6E, schematic illustrations of a spiral divided baffle 600 in accordance with an embodiment of the present disclosure are shown. FIG. 6A is an isometric illustration of the spiral divided baffle 600 and FIGS. 6B-6E are cross-sectional views of the spiral divided baffle 600 as viewed along the illustrated lines of the same letter as shown in FIG. 6A (e.g., FIG. 6B is a view of the spiral divided baffle 600 along the line B-B of FIG. 6A). In FIGS. 6B-6E, a forward direction is to the left on the page and an aft or aftward direction is to the right on the page.

The spiral divided baffle 600 includes a baffle divider 602 that extends through the spiral divided baffle 600 and includes a spiral portion 604. The baffle divider 602 divides or separates the spiral divided baffle 600 into two cavities, a first cavity 606 and a second cavity 608. The cavities 606, 608 extend a length of the spiral divided baffle 600, although in some embodiments, one or both of the cavities 606, 608 may be partial extend cavities (i.e., extend only a portion of the length of the spiral divided baffle 600).

The baffle divider 602 is arranged, with the spiral portion 604, to transition the orientation of the first and second cavities 606, 608 within the spiral divided baffle 600. For example, as shown in FIG. 6B, at a first end 610 of the spiral divided baffle 600, the first cavity 606 is located on a first side 616 and the second cavity 608 is located on a second side 620 of the spiral divided baffle 600. The baffle divider 602 separates and defines the cavities 606, 608 along with a baffle side wall 622 which defines the exterior wall of the spiral divided baffle 600.

Figure 6C:
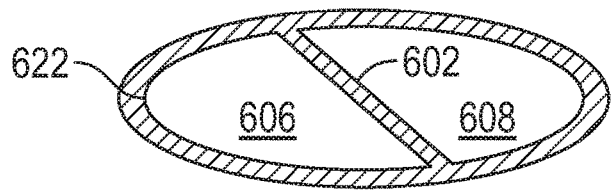
FIG. 6C is a cross-sectional illustration of the spiral divided baffle of FIG. 6A as viewed along the line C-C.
Figure 6D:
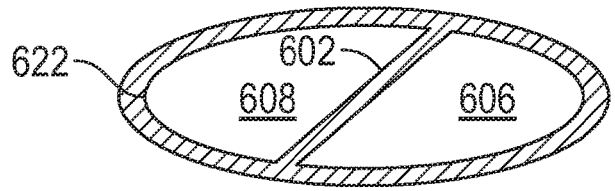
FIG. 6D is a cross-sectional illustration of the spiral divided baffle of FIG. 6A as viewed along the line D-D.
Figure 6E:
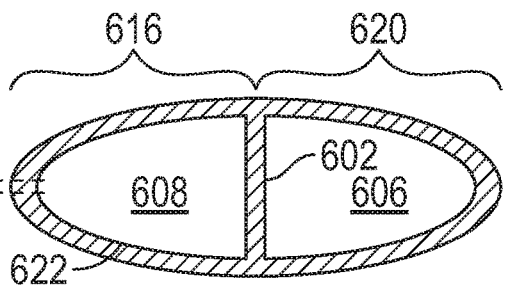
FIG. 6E is a cross-sectional illustration of the spiral divided baffle of FIG. 6A as viewed along the line E-E.

As the baffle divider 602 extends toward a second end 612 of the spiral divided baffle 600, the baffle divider 602 twists or spirals such that the orientation of the first cavity 606 and the second cavity 608 change position relative to each other. As shown in FIGS. 6C-6D, the spiral portion 604 of the divided baffle 602 causes the position of the first cavity 606 to move to the second side 620 and the position of the second cavity 608 to move to the first side 616. Accordingly, as shown in FIG. 6E, the first and second cavities 606, 608 may switch relative positions within spiral divided baffle 600 due to the spiral portion 604 of the baffle divider 602.

Although shown, the baffle side wall 622 can include one or more impingement holes 626. The impingement holes 626 may be arranged to provide impingement cooling to an airfoil in which the spiral divided baffle 600 is installed. Although shown with the impingement holes 626 located closer to the second end 612 than the spiral portion 604 of the baffle divider 602, in some embodiments, the impingement holes 626 may span the entire baffle side wall 622 from the first end 610 to the second end 612, or some sub-portion thereof.

Further, although shown with the spiral portion 604 located proximate the first end 610 of the spiral divided baffle 600, this arrangement is not to be limiting. For example, in some embodiments, the spiral portion may be located at any position along the length of the spiral divided baffle. For example, in some embodiments, the spiral portion may be located at a mid-point between a first end and a second end of the spiral divided baffle, and in other embodiments, the spiral portion may be located proximate the second end. Moreover, in some embodiments, multiple spiral portions may be employed without departing from the scope of the present disclosure. As such, a specific cooling scheme may be achieved using one or more spiral portions of a divider baffle.

Further, although shown and described above as a baffle insert, embodiments of the present disclosure are not so limited. For example, the spiral portion may be integrated into and part of an airfoil internal rib that separates internal cavities thereof. That is, the spiral may be integrated directly into the airfoil structure to achieve similar results as described above.

Figure 7A:
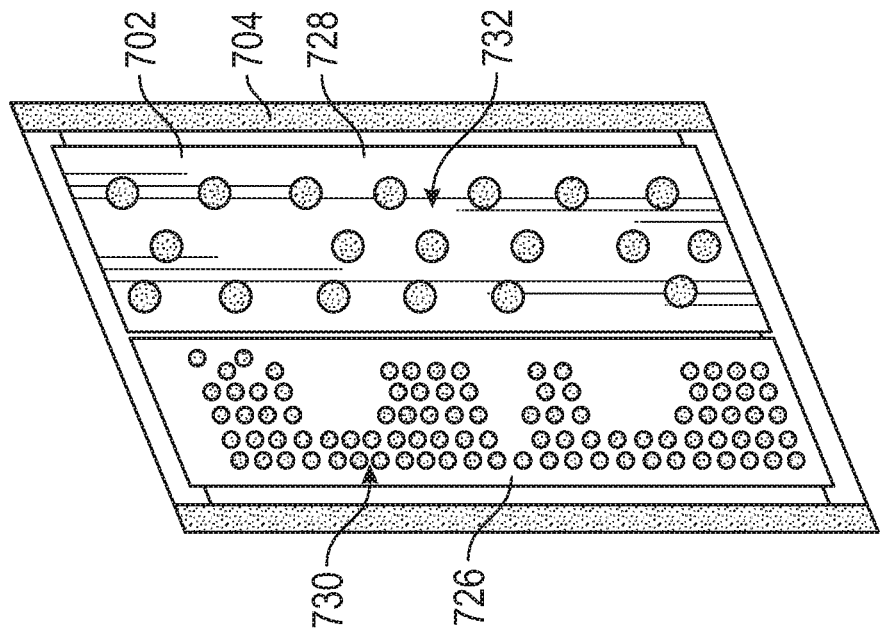
FIG. 7A is a schematic illustration of a gas turbine engine component in accordance with an embodiment of the present disclosure.
Figure 7B:
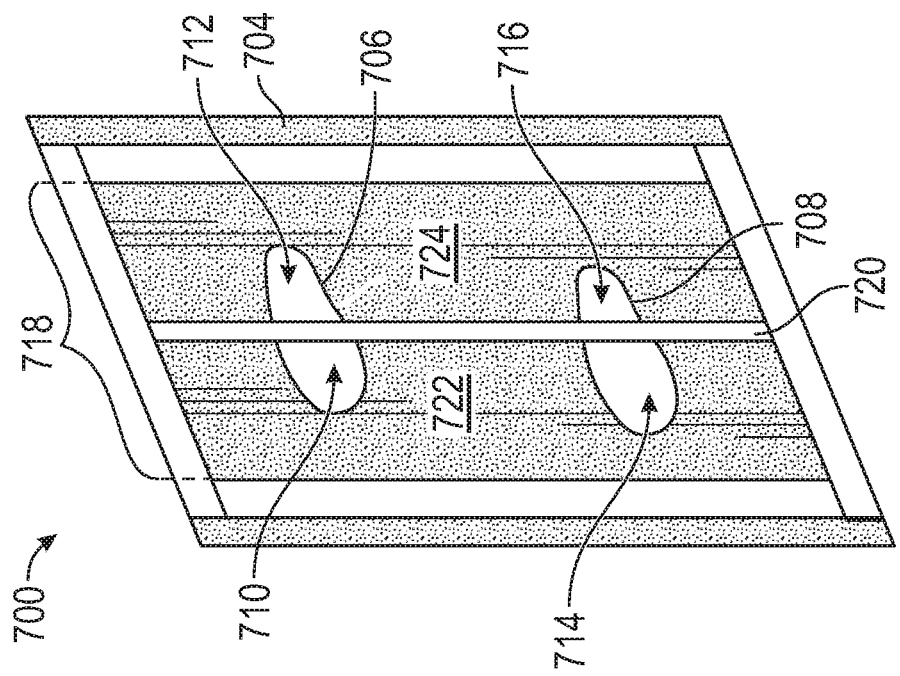
FIG. 7B is a schematic illustration of the component of FIG. 7A with a cover plate in accordance with an embodiment of the present disclosure installed thereto.

Turning now to FIGS. 7A-7B, schematic illustrations of a gas turbine engine component 700 in accordance with an embodiment of the present disclosure. FIG. 7A is a plan view of the component 700 without a cover plate installed thereon, and FIG. 7B is a plan view of the component 700 with a cover plate 702 installed thereon. The gas turbine engine component 700 includes a platform 704. Extending from the platform 704 is a first airfoil 706 and a second airfoil 708. The gas turbine engine component 700, similar to that shown in FIGS. 3A-3B, forms a portion of a vane section that can be installed in a turbine section of a gas turbine engine.

Each airfoil 706, 708 may be arranged with two separate cavities that are divided by a divider (e.g., a divided baffle or a dividing rib). The divided baffle or dividing rib of the airfoils 706, 708 may include a spiral portion similar to that shown and described above. As shown, the first airfoil 706 includes a first inlet 710 and a second inlet 712, with each inlet 710, 712 arranged to supply cooling air into a specific cavity or sub-cavity of the first airfoil 706. Similarly, the second airfoil 708 includes a first inlet 714 and a second inlet 716, with each inlet 714, 716 arranged to supply cooling air into a specific cavity or sub-cavity of the second airfoil 708.

The platform 704, in part, defines a platform cavity 718 between surfaces of the platform 704 and the cover plate 702. Cooling air may pass through the cover plate 702 and into the platform cavity 718, where the cooling air will flow into the airfoils 706, 708 through the inlets 710, 712, 714, 716. The platform cavity 718 is divided by a cavity separating rail 720, which divides the platform cavity into a first platform cavity 722 and a second platform cavity 724. In this embodiment, the first platform cavity 722 is a forward platform cavity and the second platform cavity 724 is an aft cavity. However, in other embodiments, the platform cavities may be divided pressure side and suction side, or may have various or arrangements without departing from the scope of the present disclosure. The cavity separating rail 720 is arranged to align with the divider within the airfoils 706, 708. As such, air from the first platform cavity 722 will flow into the first inlets 710, 714 and air from the second platform cavity 724 will flow into the second inlets 712, 716. Once within the airfoils 706, 708, the spiral portion will cause the aft air from the second platform cavity 724 to move to the forward portion of the airfoils 706, 708 and the air from the first platform cavity 722 to move to the aft portion of the airfoils 706, 708.

In addition to having the platform cavity 718 divided as described above, the cover plate 702 may also be optimized for cooling schemes. For example, as shown in FIG. 7B, the cover plate 702 includes a first sub-plate 726 and a second sub-plate 728. The sub-plates 726, 728 may be separately formed, or may be sub-parts of a single cover plate that is installed to the platform 704. The shapes of the sub-plates 726, 728 are set to match or mirror the shapes of the platform cavities 722, 724.

As shown, the first sub-plate 726 includes a first cavity impingement cooling aperture array 730. The second sub-plate 728 includes a second cavity impingement cooling aperture array 732. The first cavity impingement cooling aperture array 730 is arranged, as shown, with a relatively large number of small diameter or flow area impingement holes. In contrast, the second cavity impingement cooling aperture array 732 is arranged, as shown, with relatively small number of large diameter or flow area impingement holes. That is, the first cavity impingement cooling aperture array 730 may have apertures having a first diameter or flow area and the second cavity impingement cooling aperture array 732 may have apertures having a second diameter or flow area. In some embodiments, such as shown in FIG. 7B, the first diameter or flow area may be less than the second diameter or flow area. However, in other embodiments, the first diameter or flow area may be greater than the second diameter or flow area, or in other embodiments, the first and second diameters or flow areas may be the same. Further, although shown as holes, the apertures may take the form of slots or other geometries, as will be appreciated by those of skill in the art. Further, the number, location, geometry, and/or orientation of the holes may vary, without departing from the scope of the present disclosure.

Although described above with respect to hole diameter, variations in flow may be achieved though hole flow areas, individually or collectively. That is, the total flow area of one sub-plate may be different from the total flow area of the other sub-plate. Those of skill in the art will appreciate various arrangements to achieve different flow area configurations, and thus the same will not be described in detail. In some embodiments, one or both of the sub-plates may be formed with different diameter or flow area holes or apertures formed thereon. The impingement cooling through the plates/sub-plates may have any configuration and/or arrangement to achieve a desired cooling of the platform and/or cooling flow into and through the airfoil or baffle cavity.

In this example, the small diameter holes of the first sub-plate can provide for increased impingement cooling, as will be appreciated by those of skill in the art. The increased impingement can enable improved cooling at the forward side of the platform 704. A lower velocity flow may pass through the larger diameter impingement holes of the second sub-plate, and less heat pickup may be achieved thereby. Thus, when the relatively cool air is moved forward through the spiral within the airfoils 706, 708, the cool air can effectively cool the forward portions of the airfoils.

As noted above, in some embodiments, the sub-plates 726, 728 may be parts of an integral sheet that forms the cover plate 702. In such embodiments, the cover plate 702 may be welded to rails of the platform 704, including cavity separating rail 720 to provide a seal to fluidly separate the platform sub-cavities 722, 724 of the platform 704. In embodiments where the sub-plates 726, 728 are separate sheets of material, each sheet may be welded separately to the appropriate rails of the platform 704 and the cavity separating rail 720. Various types of welding may be employed without departing from the scope of the present disclosure, including, but not limited to laser welding and bead welding. Further, other types of joining may be employed without departing from the scope of the present disclosure.

Although shown herein with two airfoils, as will be appreciated by those of skill in the art, any number of airfoils can be arranged with respect to a platform. For example, the platform cavity arrangement of the present disclosure can be employed for singlets, doublets, triplets, quads, etc. and thus the present disclosure is not to be limited by the above described embodiments and illustrations. Further, although shown and described with moving aft air forward, and forward air aft, the opposite may be true depending on the desired cooling scheme. Furthermore, in some embodiments, the air may be moved from the pressure side to the suction side, or vice versa, depending on the specific configuration employed. Moreover, although described with respect to an outer diameter platform, the present platform arrangements may be employed at an inner diameter platform.

Advantageously, embodiments provided herein are directed to optimizing platform and airfoil cooling. For example, optimized platform cooling can be achieved while simultaneously allowing a cooler of the two platform cooling air streams to cool the airfoil.

In accordance with an example embodiment of the present disclosure, a platform (impingement) cooling air is separated into two distinct cavities. The separate cavities feed two distinct cavities of a baffle (or airfoil), and the air dumps to two distinct parts of the engine (e.g., through flow versus airfoil cooling flow). Because the two platform cooling circuits are segregated, the impingement cooling can be optimized. For example, platform cooling demands tend to be more extreme at the leading edge, so the forward-platform impingement air will heat up more. If this air were used for airfoil cooling, the additional heat-up at the platform may impact part life. However, by using a spiral baffle as described herein, the leading edge platform cooling air can be used as through flow and the aft-platform impingement air can be used as airfoil cooling air.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A baffle for installation within a gas turbine engine, the baffle comprising:
a baffle side wall extending between a first end and a second end; and
a baffle divider within the baffle side wall, wherein the baffle divider and the baffle side wall define a first cavity and a second cavity,
wherein the first cavity is located at a first side at the first end and the second cavity is located at a second side at the first end, and wherein the first cavity has a first cavity inlet at the first end and the second cavity has a second cavity inlet at the first end,
wherein the baffle divider includes a spiral portion such that the first cavity is transitioned toward the second side and the second cavity is transitioned toward the first side such that the first cavity is located at the second side and the second cavity is located at the first side at the second end,
wherein the first side includes one or more impingement holes.

2. The baffle of claim 1, further comprising an end cap located at the second end and sealing an end of the second cavity.

3. A component for a gas turbine engine, the component comprising:
a platform;
an airfoil extending from the platform, wherein the airfoil comprises a first cavity inlet at a first side and a second cavity inlet at a second side and the airfoil has a first cavity and a second cavity separated by a divider, the divider having a spiral portion and the first cavity inlet is fluidly connected to the first cavity and the second cavity inlet is fluidly connected to the second cavity;
a cover plate attached to the platform on a side opposite the airfoil, wherein a platform cavity is defined between the cover plate and the platform; and
a cavity separating rail dividing the platform cavity into a first platform cavity and a second platform cavity, wherein the first platform cavity is fluidly connected to the first cavity through the first cavity inlet and the second platform cavity is fluidly connected to the second cavity through the second cavity inlet;
wherein a flow of air from the first platform cavity enters the airfoil at the first inlet and flows through the first cavity along the first side and is transitioned toward the second side by the spiral portion of the divider, and
wherein a flow of air from the second platform cavity enters the airfoil at the second inlet and flows through the second cavity along the second side and is transitioned toward the first side by the spiral portion of the divider.

4. The component of claim 3, wherein the cover plate includes a first sub-plate and a second sub-plate, wherein the first sub-plate covers the first platform cavity and the second sub-plate covers the second platform cavity.

5. The component of claim 4, wherein the first sub-plate includes a first cavity impingement cooling aperture array and the second sub-plate includes a second cavity impingement cooling aperture array.

6. The component of claim 5, wherein the first cavity impingement cooling aperture array comprises a plurality of holes having a first flow area and the second cavity impingement cooling aperture array comprises a plurality of holes having a second flow area.

7. The component of claim 6, wherein the first flow area is less than the second flow area.

8. The component of claim 3, wherein the airfoil comprises a baffle installed therein, wherein the divider is part of the baffle.

9. The component of claim 3, further comprising:
a second airfoil extending from the platform, wherein the second airfoil comprises a respective second-airfoil first cavity inlet at a second-airfoil first side and a respective second-airfoil second cavity inlet at a second-airfoil second side and the second airfoil has a second-airfoil first cavity and a second-airfoil second cavity separated by a second-airfoil divider, the second-airfoil divider having a second-airfoil divider spiral portion and the second-airfoil first cavity inlet is fluidly connected to the second-airfoil first cavity and the second-airfoil second cavity inlet is fluidly connected to the second-airfoil second cavity;
wherein the cover plate covers the second-airfoil first cavity inlet and the second-airfoil second cavity inlet of the second airfoil.

10. The component of claim 3, wherein the cover plate includes a first sub-plate and a second sub-plate formed as a unitary body.

11. The component of claim 3, wherein the cover plate includes a first sub-plate and a second sub-plate formed as separate sheets of material that are welded to the platform.

12. The component of claim 3, wherein the first side includes one or more impingement holes.

13. The component of claim 3, further comprising an end cap located to seal an end of the second cavity.

14. A gas turbine engine comprising:
a combustor section; and
a turbine section downstream from the combustor section, the turbine section comprising at least one component, wherein the component comprises:
a platform;
an airfoil extending from the platform, wherein the airfoil comprises a first cavity inlet at a first side and a second cavity inlet at a second side and the airfoil has a first cavity and a second cavity separated by a divider, the divider having a spiral portion and the first cavity inlet is fluidly connected to the first cavity and the second cavity inlet is fluidly connected to the second cavity;
a cover plate attached to the platform on a side opposite the airfoil, wherein a platform cavity is defined between the cover plate and the platform; and
a cavity separating rail dividing the platform cavity into a first platform cavity and a second platform cavity, wherein the first platform cavity is fluidly connected to the first cavity through the first cavity inlet and the second platform cavity is fluidly connected to the second cavity through the second cavity inlet;
wherein a flow of air from the first platform cavity enters the airfoil at the first inlet and flows through the first cavity along the first side and is transitioned toward the second side by the spiral portion of the divider, and
wherein a flow of air from the second platform cavity enters the airfoil at the second inlet and flows through the second cavity along the second side and is transitioned to the first side by the spiral portion of the divider.

15. The gas turbine engine of claim 14, wherein the cover plate includes a first sub-plate and a second sub-plate, wherein the first sub-plate covers the first platform cavity and the second sub-plate covers the second platform cavity.

16. The gas turbine engine of claim 15, wherein the first sub-plate includes a first cavity impingement cooling aperture array and the second sub-plate includes a second cavity impingement cooling aperture array.

17. The gas turbine engine of claim 14, wherein the airfoil comprises a baffle installed therein, wherein the divider is part of the baffle.

18. The gas turbine engine of claim 14, further comprising:
a second airfoil extending from the platform, wherein the second airfoil comprises a respective second-airfoil first cavity inlet at a second-airfoil first side and a respective second-airfoil second cavity inlet at a second-airfoil second side and the second airfoil has a second-airfoil first cavity and a second-airfoil second cavity separated by a second-airfoil divider, the second-airfoil divider having a second-airfoil divider spiral portion and the second-airfoil first cavity inlet is fluidly connected to the second-airfoil first cavity and the second-airfoil second cavity inlet is fluidly connected to the second-airfoil second cavity;
wherein the cover plate covers the second-airfoil first cavity inlet and the second-airfoil second cavity inlet of the second airfoil.

19. The gas turbine engine of claim 14, wherein the airfoil comprises a baffle installed therein, wherein the divider is part of the baffle.

* * * * *